United States Patent
Dittmer et al.

(10) Patent No.: US 9,121,543 B2
(45) Date of Patent: Sep. 1, 2015

(54) SWING ARM, TILT POSITIONABLE MOUNT FOR ELECTRONIC DISPLAY

(75) Inventors: Jay Dittmer, Prior Lake, MN (US); Jeff Bremmon, Shakopee, MN (US); Jamie Brandt, Savage, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 448 days.

(21) Appl. No.: 13/806,971

(22) PCT Filed: Jun. 27, 2011

(86) PCT No.: PCT/US2011/042014
§ 371 (c)(1),
(2), (4) Date: Mar. 14, 2013

(87) PCT Pub. No.: WO2012/006016
PCT Pub. Date: Jan. 12, 2012

(65) Prior Publication Data
US 2013/0187019 A1 Jul. 25, 2013

Related U.S. Application Data

(60) Provisional application No. 61/359,218, filed on Jun. 28, 2010.

(51) Int. Cl.
*G06F 1/16* (2006.01)
*F16M 13/02* (2006.01)
*F16M 11/10* (2006.01)
*F16M 11/20* (2006.01)

(52) U.S. Cl.
CPC ............... *F16M 13/02* (2013.01); *F16M 11/10* (2013.01); *F16M 11/2014* (2013.01); *F16M 11/2085* (2013.01); *F16M 11/2092* (2013.01); *F16M 2200/02* (2013.01); *F16M 2200/04* (2013.01); *F16M 2200/061* (2013.01); *F16M 2200/065* (2013.01)

(58) Field of Classification Search
CPC .............................. F16M 11/08; F16M 11/10
USPC ...................................... 248/920; 361/679.21
See application file for complete search history.

(56) References Cited

U.S. PATENT DOCUMENTS

| | | | | |
|---|---|---|---|---|
| D539,127 S | * | 3/2007 | Ly Hau et al. | D8/373 |
| 7,398,950 B2 | * | 7/2008 | Hung | 248/276.1 |
| 7,487,943 B1 | * | 2/2009 | Gillespie | 248/282.1 |
| 7,513,469 B1 | | 4/2009 | Ciungan | |
| D611,479 S | * | 3/2010 | Hau et al. | D14/452 |

(Continued)

FOREIGN PATENT DOCUMENTS

| | | |
|---|---|---|
| CN | 1806144 A | 7/2006 |
| CN | 101427299 A | 5/2009 |

(Continued)

OTHER PUBLICATIONS

The State Intellectual Property Office of China, First Office Action for Application No. 201180032584.5, dated Mar. 16, 2015 (including English Translation) (10 pages total).

*Primary Examiner* — Anthony Q Edwards
(74) *Attorney, Agent, or Firm* — Patterson Thuente Pedersen, P.A.

(57) ABSTRACT

A flat panel display mount that enables full motion positioning of a display while maintaining a very thin profile for the mount such that the display can be positioned as closely as possible to the wall when desired.

20 Claims, 17 Drawing Sheets

(56) References Cited

U.S. PATENT DOCUMENTS

| | | | |
|---|---|---|---|
| 7,866,621 B1 * | 1/2011 | Walters | 248/421 |
| 8,245,990 B2 * | 8/2012 | Huang | 248/276.1 |
| 8,310,468 B2 | 11/2012 | Martin | |
| 8,693,172 B2 * | 4/2014 | Russell et al. | 361/679.01 |
| 9,004,430 B2 * | 4/2015 | Conner | 248/277.1 |
| 2006/0186294 A1 * | 8/2006 | Van Groesen et al. | 248/284.1 |
| 2007/0252060 A1 | 11/2007 | McPherson | |
| 2008/0001048 A1 * | 1/2008 | Woo et al. | 248/276.1 |
| 2008/0078906 A1 * | 4/2008 | Hung | 248/276.1 |
| 2008/0253071 A1 | 10/2008 | Stoelinga et al. | |
| 2009/0050763 A1 * | 2/2009 | Dittmer | 248/284.1 |
| 2009/0179128 A1 | 7/2009 | Boberg | |

FOREIGN PATENT DOCUMENTS

| | | |
|---|---|---|
| EP | 1486719 A1 | 12/2004 |
| WO | WO 2008/085889 A1 | 7/2008 |
| WO | WO 2009/089169 A1 | 7/2009 |

* cited by examiner

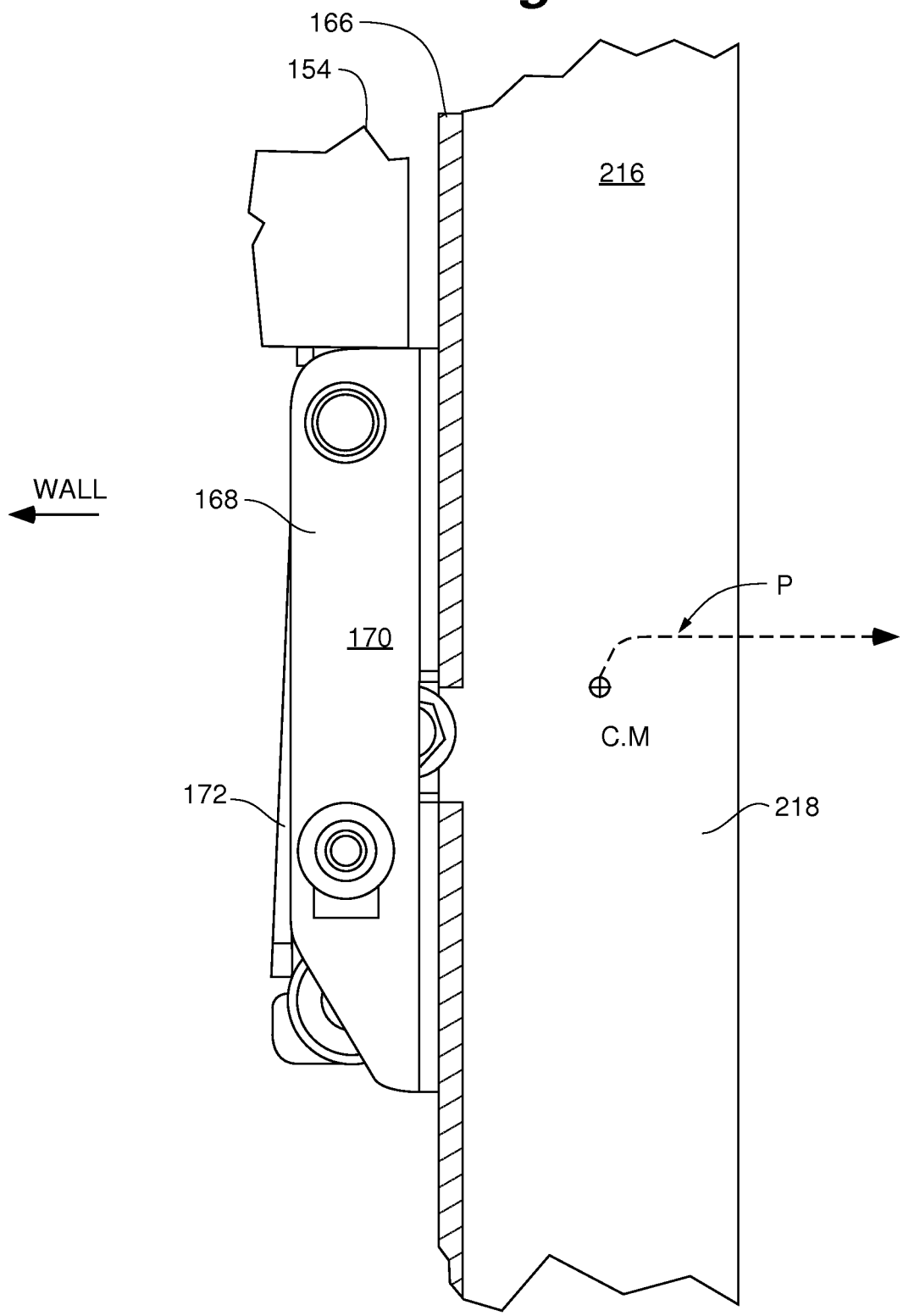

SWING ARM, TILT POSITIONABLE MOUNT FOR ELECTRONIC DISPLAY

RELATED APPLICATIONS

The application claims the benefit of U.S. Provisional Application Ser. No. 61/359,218, filed Jun. 28, 2010, and entitled SWING ARM, TILT POSITIONABLE MOUNT FOR ELECTRONIC DISPLAY, said application being hereby fully incorporated herein by reference.

FIELD OF THE INVENTION

The present invention relates to mounts for televisions and monitors, and more specifically to mounts for televisions and monitors enabling positional adjustment of the display.

BACKGROUND OF THE INVENTION

As flat panel television and monitor technology advances, the displays become ever larger and thinner. The most desirable aesthetic for an electronic display is to be as thin as possible, and if mounted on a wall, to essentially have the appearance of a framed photograph. At the same time, it is highly desirable to be able to dynamically position the orientation of the display so as to enable the best possible viewing angle for the audience; usually perpendicular to the plane of the display screen.

Mounts have been previously developed that enable a wall mounted display to be positioned at nearly any angle or position. These prior mounts, however, generally have drawbacks. For example, a mount must be of relatively heavy construction in order to safely support a large electronic display. But, such heavy mounts generally require more than one person for installation of the mount—one to hold the mount in the desired position, and another to fasten the mount in place. This adds time, difficulty, and expense to the installation.

Another drawback of prior heavy mounts is that the size of the components dictates that the mount is relatively thicker, meaning that the display is positioned a relatively greater distance from the wall when the display is positioned as close as possible to the wall. This detracts from the desirable aesthetic mentioned above.

What is needed is a mount for flat panel displays that addresses the need in the industry for a mount that addresses the drawbacks of the prior art mounts.

SUMMARY OF THE INVENTION

Embodiments of the present invention address the needs of the industry for a flat panel display mount that enables full motion positioning of a display while maintaining a very thin profile for the mount such that the display can be positioned as closely as possible to the wall when desired. Further, the mount of embodiments of the invention is capable of being mounted to the wall by only one person working alone.

In an embodiment, a mount for an electronic display device includes a wall interface including a substantially vertically oriented column portion, an articulating arm assembly operably coupled with the column portion, and a display interface. The display interface presents a display interface surface for receiving the electronic display device and a display tilt assembly enabling selective horizontal tilting of the display interface surface relative to the wall. The display tilt assembly is operably coupled to the articulating arm assembly and includes a support interface portion defining a vertically oriented recess on a rear side thereof. The articulating arm assembly enables selective shifting of the display interface between a first position closely proximate the wall interface such that the column portion of the wall interface is received in the recess of the support interface portion, and a second position in which the display interface is spaced apart from the wall interface.

The wall interface can further include an upper mounting bracket and a lower mounting bracket spaced apart from the upper mounting bracket, the column portion extending between the upper mounting bracket and the lower mounting bracket. In an embodiment, the articulating arm assembly can include a pair of articulating arms.

In an embodiment, the display tilt assembly is selectively tiltable between a first generally upright position in which a top edge of the display interface surface is positioned rearwardly relative to a bottom edge of the display interface surface and a tilt position in which the top edge of the display interface surface is positioned forwardly relative to a bottom edge of the display interface surface. A center of mass of an electronic display received on the display mounting surface may first rise vertically, and then proceed along a substantially horizontal path relative to the ground as the display tilt assembly is shifted between the first generally upright position and the tilt position. The display tilt assembly may further include an interface body and pair of spaced apart arm assemblies operably coupling the interface body with the support interface portion. The spaced apart arm assemblies may each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

In an embodiment, an electronic display system includes an electronic display device, a wall interface including a substantially vertically oriented column portion, an articulating arm assembly operably coupled with the column portion, and a display interface. The display interface presents a display interface surface receiving the electronic display device thereon and a display tilt assembly enabling selective horizontal tilting of the electronic display device relative to the wall. The display tilt assembly is operably coupled to the articulating arm assembly and includes a support interface portion defining a vertically oriented recess on a rear side thereof. The articulating arm assembly enables selective shifting of the display interface between a first position closely proximate the wall interface such that the column portion of the wall interface is received in the recess of the support interface portion, and a second position in which the display interface is spaced apart from the wall interface. The wall interface may further include an upper mounting bracket and a lower mounting bracket spaced apart from the upper mounting bracket, the column portion extending between the upper mounting bracket and the lower mounting bracket. The articulating arm assembly may include a pair of articulating arms.

In an embodiment, the display tilt assembly is selectively tiltable between a first generally upright position in which a top edge of the electronic display device is positioned rearwardly relative to a bottom edge of the electronic display device and a tilt position in which the top edge of the electronic display device is positioned forwardly relative to a bottom edge of the electronic display device. A center of mass of the electronic display device may first rise vertically, and then proceed along a substantially horizontal path relative to the ground as the display tilt assembly is shifted between the first generally upright position and the tilt position. In an embodiment, the display tilt assembly may further include an interface body and pair of spaced apart arm assemblies operably coupling the interface body with the support interface portion. The spaced apart arm assemblies can each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

In an embodiment, a mount for an electronic display device includes a wall interface including a substantially vertically oriented column portion, an articulating arm assembly operably coupled with the column portion, and a display interface. The display interface presents a display interface surface for receiving the electronic display device and has tilt means for enabling selective horizontal tilting of the display interface surface relative to the wall. The tilt means includes a support interface defining a vertically oriented recess on a rear side thereof. The articulating arm assembly enables selective shifting of the display interface between a first position closely proximate the wall interface such that the column portion of the wall interface is received in the recess of the support interface, and a second position in which the display interface is spaced apart from the wall interface.

In an embodiment, the tilt means enables selective tilting between a first generally upright position in which a top edge of the display interface surface is positioned rearwardly relative to a bottom edge of the display interface surface and a tilt position in which the top edge of the display interface surface is positioned forwardly relative to a bottom edge of the display interface surface. A center of mass of an electronic display received on the display mounting surface may first rise vertically, and then proceed along a substantially horizontal path relative to the ground as the tilt means is shifted between the first generally upright position and the tilt position. The tilt means can include an interface body and pair of spaced apart arm assemblies operably coupling the interface body with the support interface portion. The spaced apart arm assemblies can each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

In an embodiment, a method of installing a mount for an electronic display device includes attaching a first bracket to a wall, coupling a first end of a generally vertically oriented column portion to the first bracket, coupling a second end of the column portion to a second bracket, and attaching the second bracket to the wall. The method may further include coupling an arm assembly to the column portion, and coupling a display interface assembly to the arm assembly.

In an embodiment, a mount for an electronic display device includes a first generally horizontal bracket, a second generally horizontal bracket, and a generally vertical elongate column portion extending between the first bracket and the second bracket. Each of the first and second brackets define structure for slidably receiving cooperating structure defined on opposing ends of the column portion. In an embodiment, the column portion defines structure for receiving an arm assembly, and the arm assembly receives a display interface, which may include a tilt assembly for enabling tilt adjustment of an electronic display coupled to the display interface.

BRIEF DESCRIPTION OF THE DRAWINGS

The invention may be more completely understood in consideration of the following detailed description of various embodiments of the invention in connection with the following drawings, in which:

FIG. 6 is a fragmentary side cross-sectional view of the tilt assembly of the mount of FIG. 1 with a flat panel display attached, depicting the mount in a fully upright tilt position;

Figure 1:
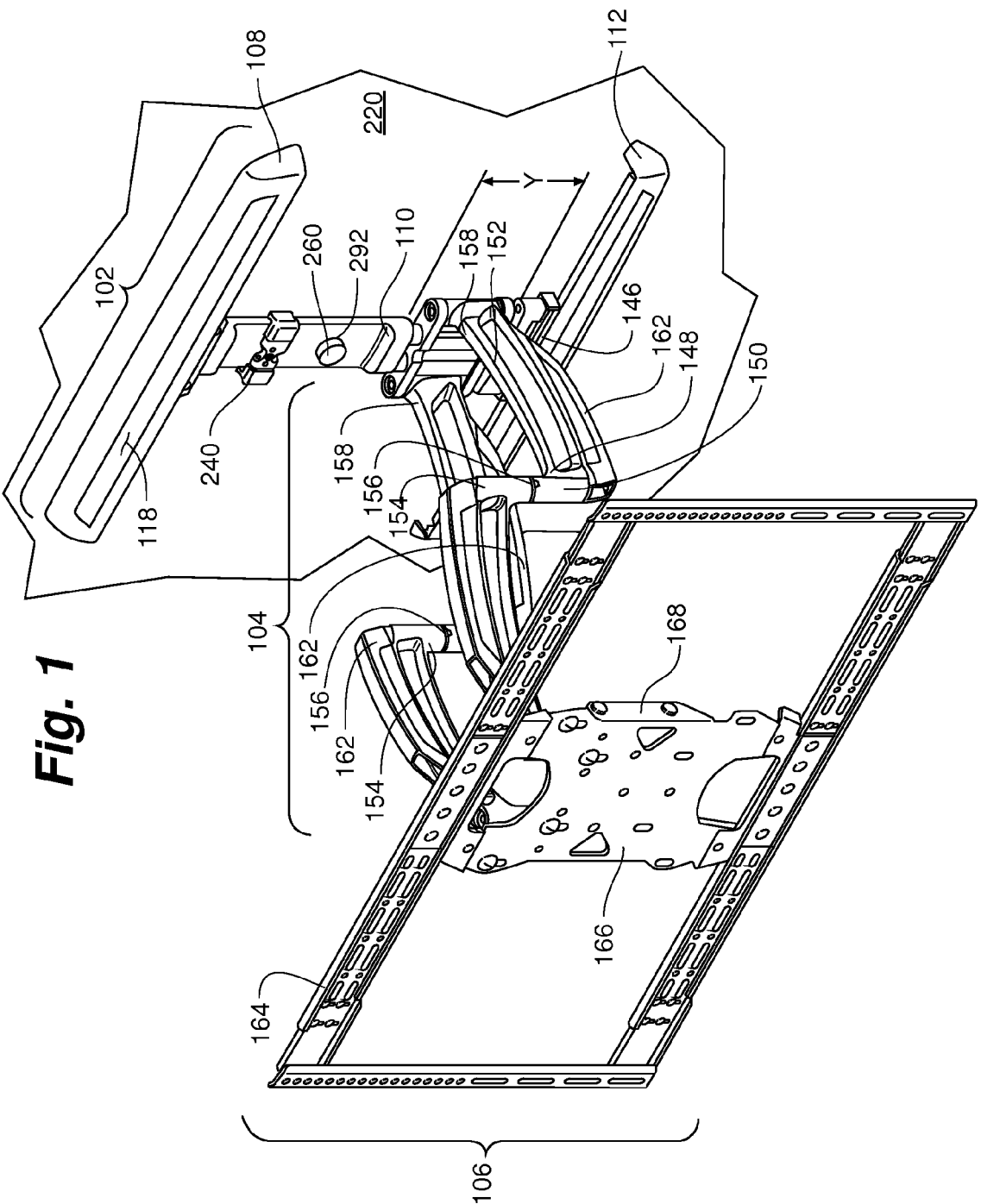
FIG. 1 is a perspective view of a mount according to an embodiment of the invention in an extended position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION

Display mount 100 generally includes wall interface assembly 102, swing arm assembly 104, and display interface assembly 106. Wall interface assembly 102 generally includes upper wall bracket assembly 108, central support assembly 110, and lower wall bracket assembly 112. Upper wall bracket assembly 108 generally includes wall bracket 114, clamp assembly 116, and cover 118.

Figure 9:
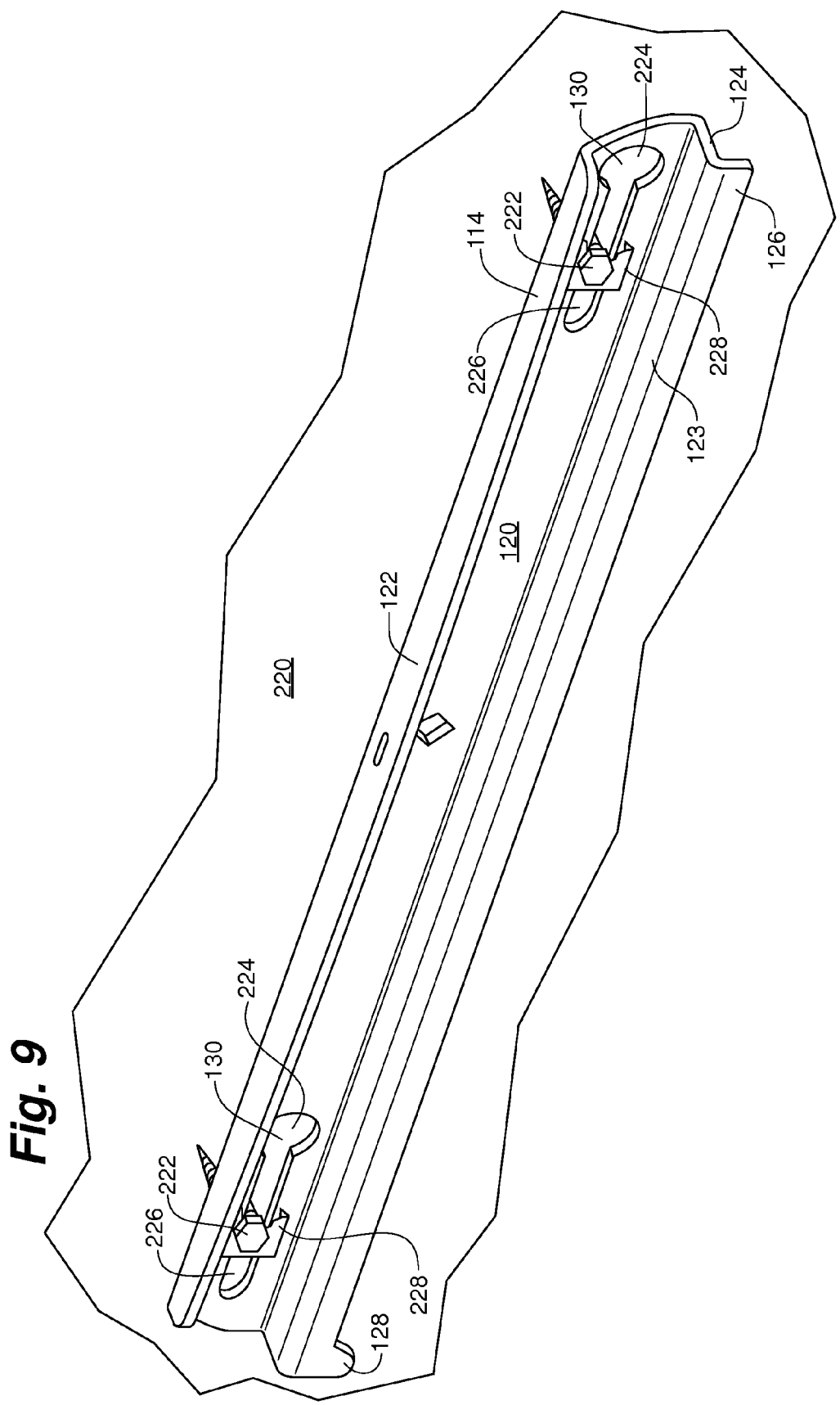
FIG. 9 is a perspective view of a wall bracket portion of the mount of FIG. 1.

As depicted in FIG. 9, wall bracket 114 has back plane 120 with outwardly projecting wall 122 along one edge, and lip 123 with horizontal portion 124 and vertical portion 126 along the opposing edge. Tab 128 extends downwardly from vertical portion 126 at one end of wall bracket 114. Back plane 120 defines a pair of keyhole apertures 130.

Figure 10:
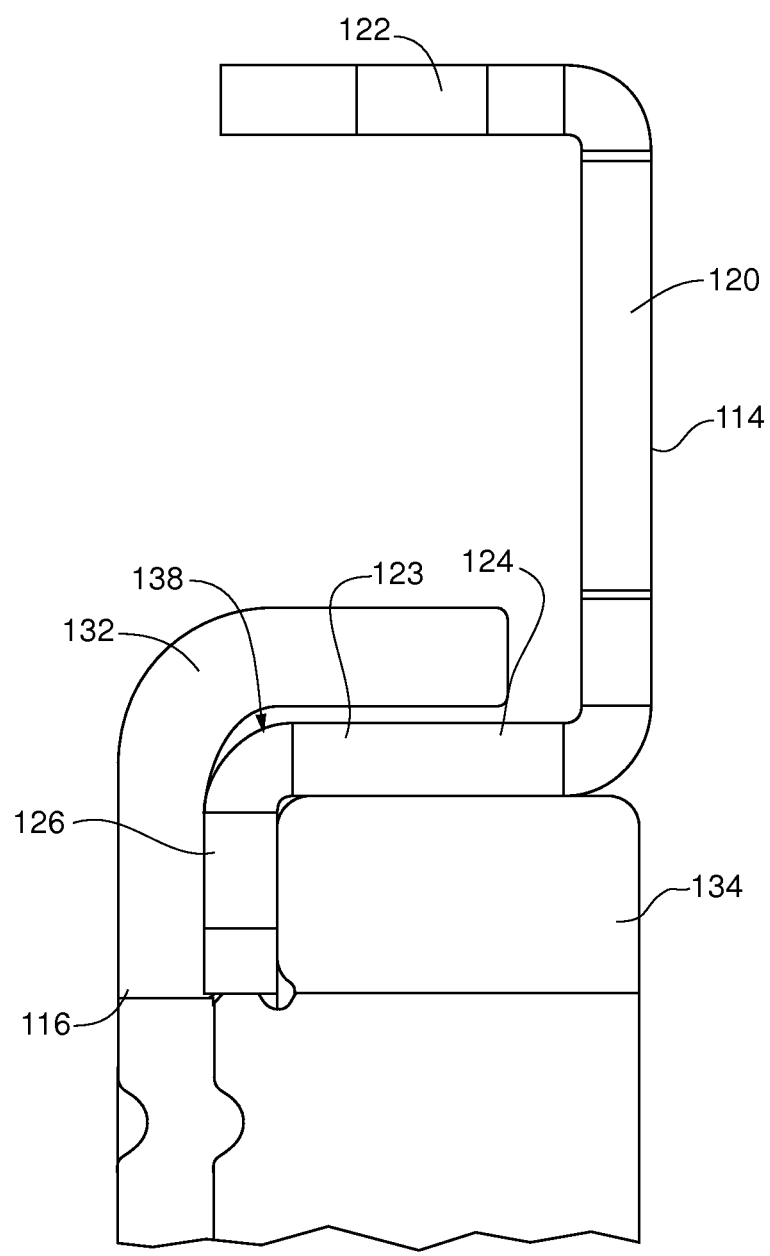
FIG. 10 is a fragmentary side elevation view of the wall bracket and clamp portion of the mount of FIG. 1.
Figure 11:
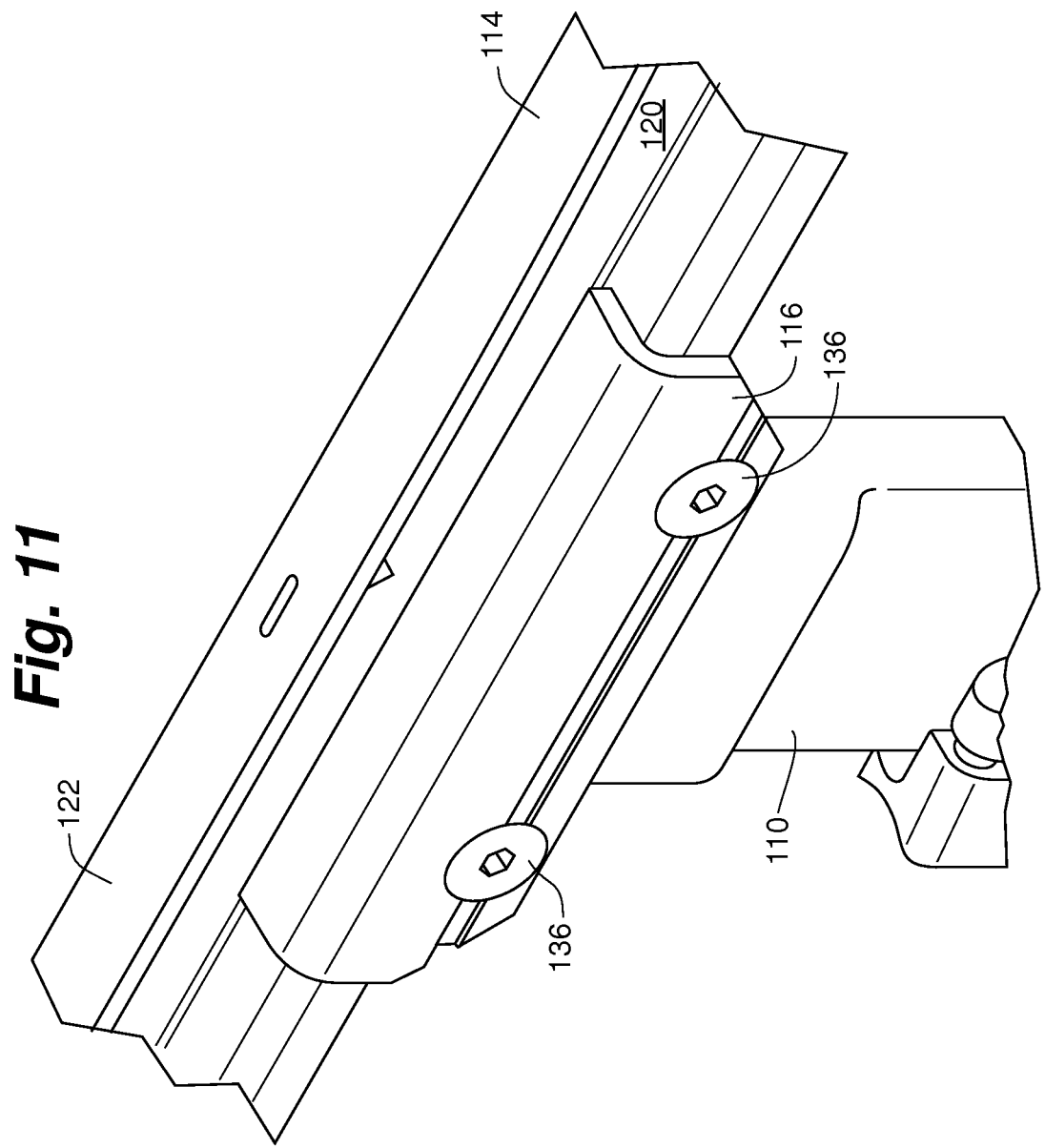
FIG. 11 is a fragmentary perspective view of the wall bracket and clamp portion of the mount of FIG. 1.

As depicted in FIGS. 10 and 11, clamp assembly 116 generally includes L-shaped outer portion 132 and clamp block 134. L-shaped outer portion 132 is removably secured to clamp block 134 with fasteners 136. As depicted in FIG. 10, lip 123 of wall bracket 114 is received in L-shaped recess 138 defined between L-shaped outer portion 132 and clamp block 134. Lower wall bracket assembly 112 is identical to upper wall bracket assembly 108, except inverted.

Central support assembly 110 is coupled to clamp assembly 116 of each of upper wall bracket assembly 108 and lower wall bracket assembly 112, and generally includes upper support column 136, central support columns 138, 140, lower support block 142, and arm carrier 144. Arm carrier 144 is vertically shiftable on central support columns 138, 140, by turning vertical adjustment screw 146, so that the vertical position of the swing arm assembly 104 can be adjusted within a range "Y" (depicted in FIG. 1) relative to upper wall bracket assembly 108 and lower wall bracket assembly 112.

Figure 2:
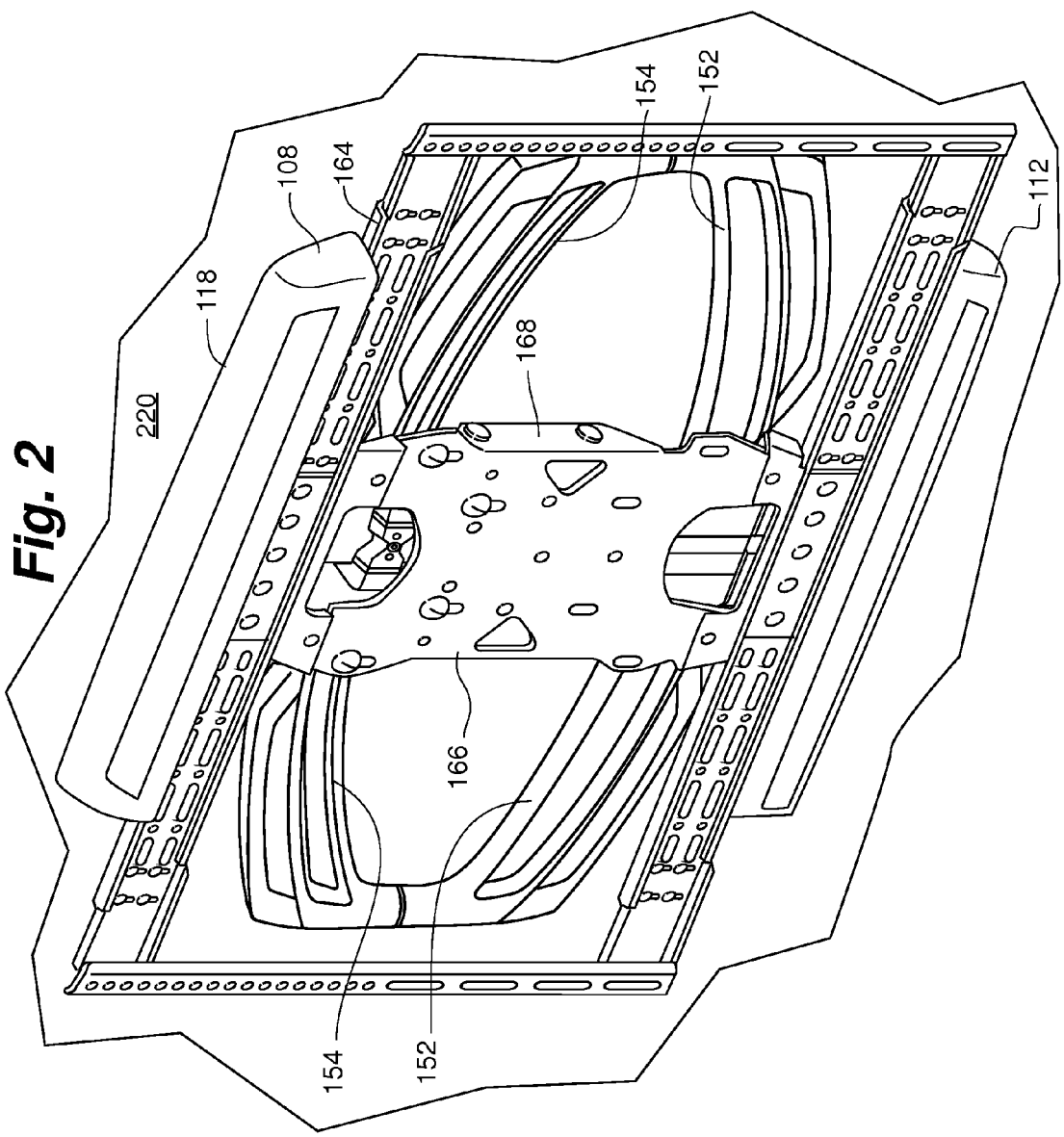
FIG. 2 is a perspective view of the mount of FIG. 1 in a folded position adjacent a wall to which the mount is attached.
Figure 3:
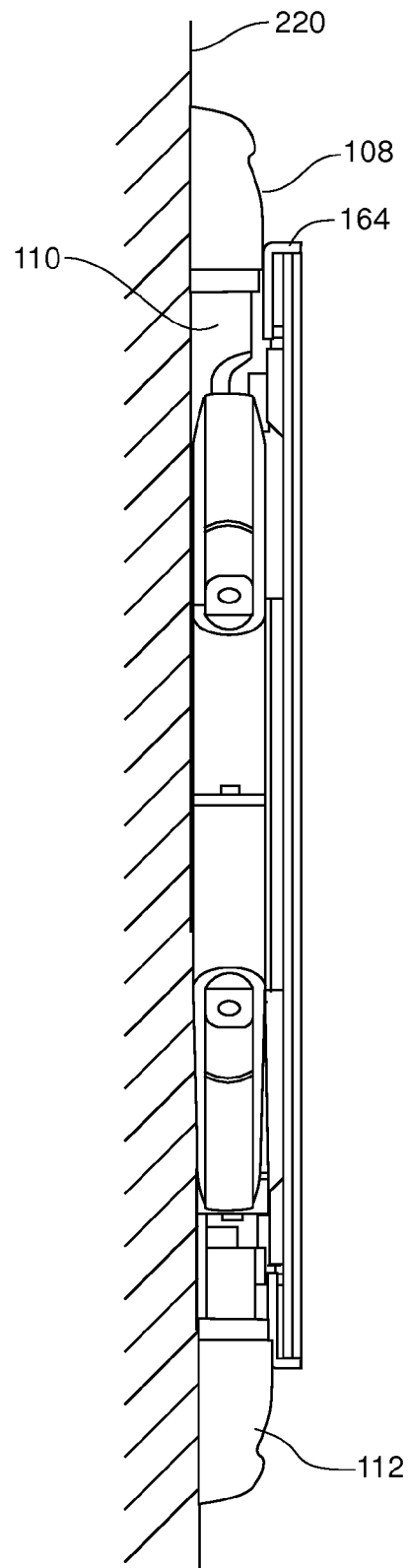
FIG. 3 is a side elevation view of the mount of FIG. 1 in the folded position.
Figure 4:
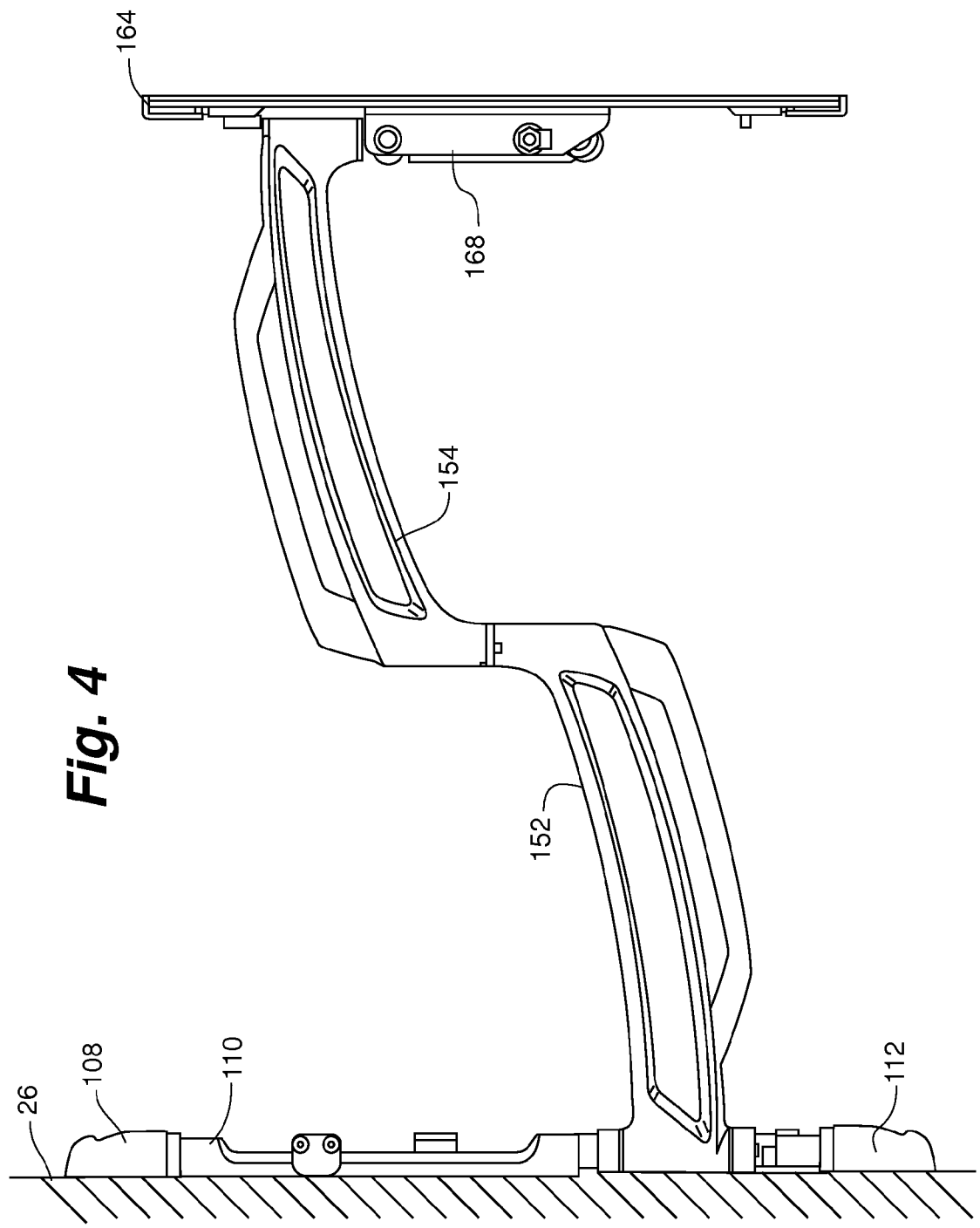
FIG. 4 is a side elevation view of the mount of FIG. 1 in the extended position.
Figure 5:
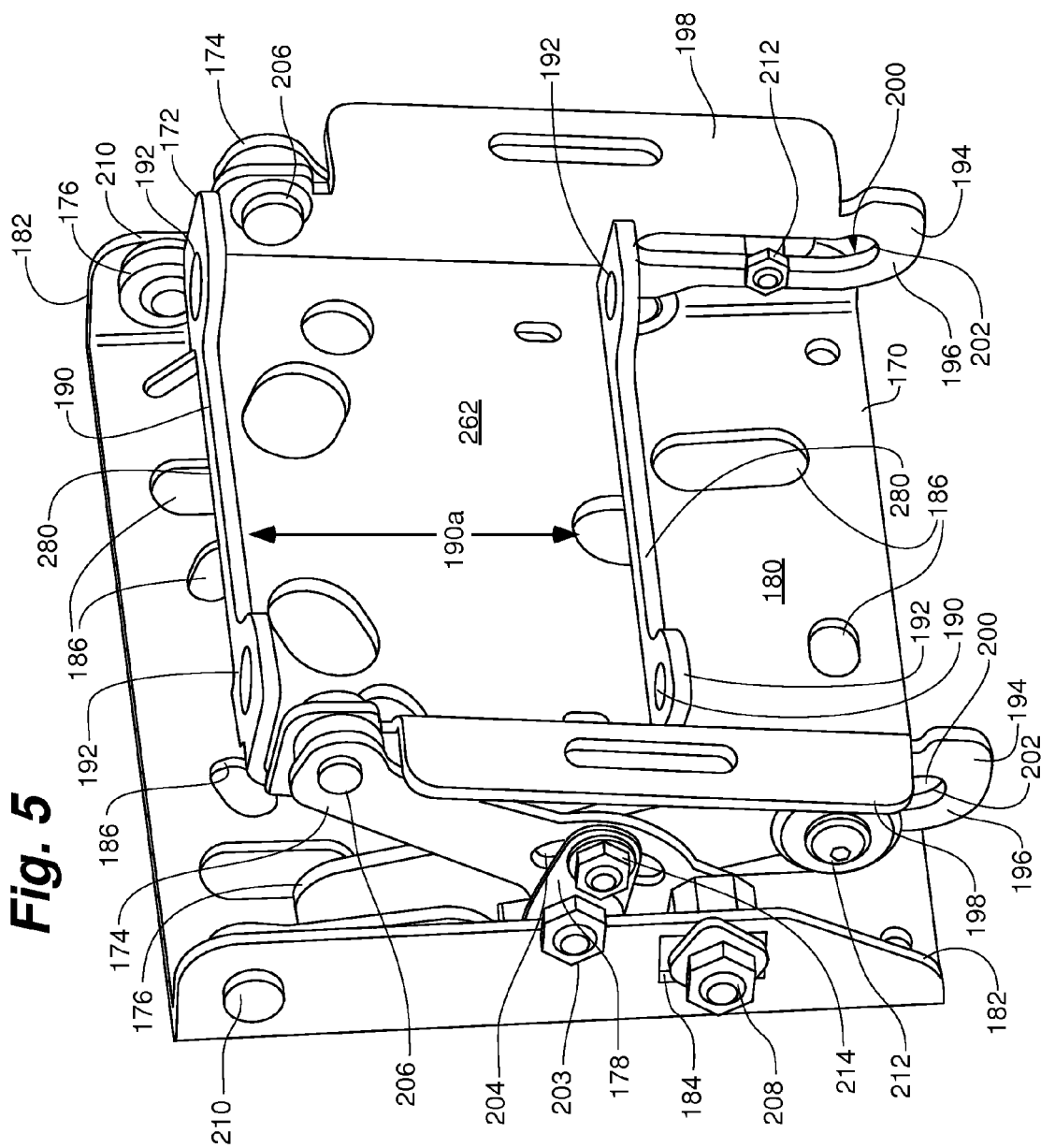
FIG. 5 is a rear perspective view of the tilt assembly of the mount of FIG. 1 with a portion of the assembly depicted in phantom for clarity.
Figure 5A:
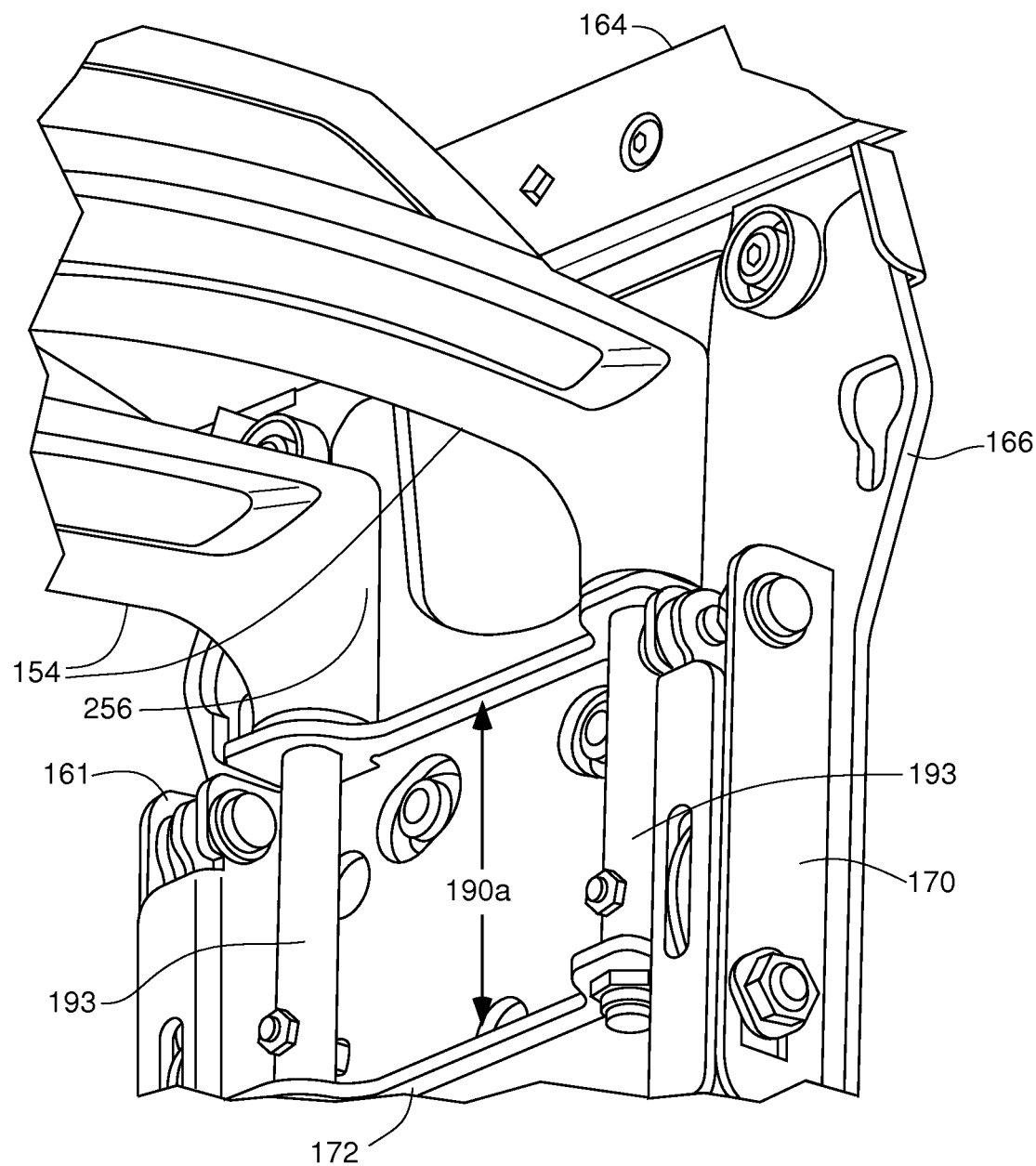
FIG. 5A is a rear perspective view of the tilt assembly of the mount of FIG. 1 showing the tilt assembly pivotally attached to the swing arms.

Swing arm assembly 104 generally includes a pair of articulating arms 148, 150. Each arm 148, 150, generally includes lower arm 152 and upper arm 154, pivotally coupled together at pivot joint 156. Inner end 158 of each lower arm 152 is pivotally coupled to arm carrier 144. Outer end 160 of each upper arm 154 is pivotally coupled to display interface assembly 106. These pivotal connections enable display interface assembly 106 to be selectively shifted between a wall-hugging position as depicted in FIG. 2 and an extended position where display interface assembly 106 is positioned away from the wall as depicted in FIG. 1. In addition, when display interface assembly 106 is positioned away from the wall, display interface assembly 106 can be shifted laterally relative to wall interface assembly 102 to laterally position the electronic display attached to display interface assembly 106. It will be appreciated that hollow wire management covers 162 can be provided on each lower arm 152 and upper arm 154 to conceal and route wires and cables extending between connections in the wall and the electronic display attached to display interface assembly 106.

Display interface assembly 106 generally includes display interface 164, central coupling plate 166 and display tilt assembly 168. Display tilt assembly 168 is depicted in FIGS. 5-8 and generally includes interface body 170, support interface 172, a pair of first tilt arms 174, a pair of second tilt arms 176, and a pair of guide arms 178. Interface body 170 includes planar portion 180 with a pair of rearwardly projecting walls 182 at each lateral edge. Each wall 182 defines a rectangular aperture 184. Planar portion 180 defines a plurality of apertures 186 for receiving fasteners to attach planar portion 180 to central coupling plate 166.

Support interface 172 generally includes central body portion 188 with a pair of opposing walls 190 projecting rearwardly at the top and bottom margins. Each of walls 190 defines a pair of spaced apart apertures 192 positioned such that each the apertures 192 are vertically registered. Notably walls 190 are shaped conformingly to central support assembly 110 in the space between apertures 192, effectively defining a vertically oriented recess 190a for receiving central support assembly 110, so that tilt assembly 168 can be positioned as closely as possible to central support assembly 110 when the mount is placed in the folded position of FIG. 2. Apertures 192 receive pivot pins 193, which pivotally couple upper arms 154 to support interface 172. Support interface 172 also includes opposing lateral flange structures 194, each including a wall portion 196 oriented perpendicular to central body portion 188, and a laterally projecting flange 198 extending from each wall portion 196. Wall portion 196 defines vertically oriented slot 200 which has a slightly rearwardly inclined portion 202 at the bottom end.

Each first arm 174 is pivotally coupled to second arm 176 at pivot 203, and defines an arcuate slot 204 centered on pivot 203. First arm 174 is pivotally coupled to support interface 172 at pivot 206, and pivotally coupled to interface body 170 at pivot 208. Pivot 208 is received in rectangular aperture 184 such that pivot 208 can shift vertically. Each second arm 176 is pivotally coupled to interface body 170 at pivot 210, and is also pivotally coupled to support interface 172 at pivot 212. Pivot 212 is slidingly received in slot 200, such that pivot 212 can shift vertically in the slot 200. Guide arm 178 extends between pivot 203 and guide stud 214 which extends from second arm 176 and through arcuate slot 204.

Figure 7:
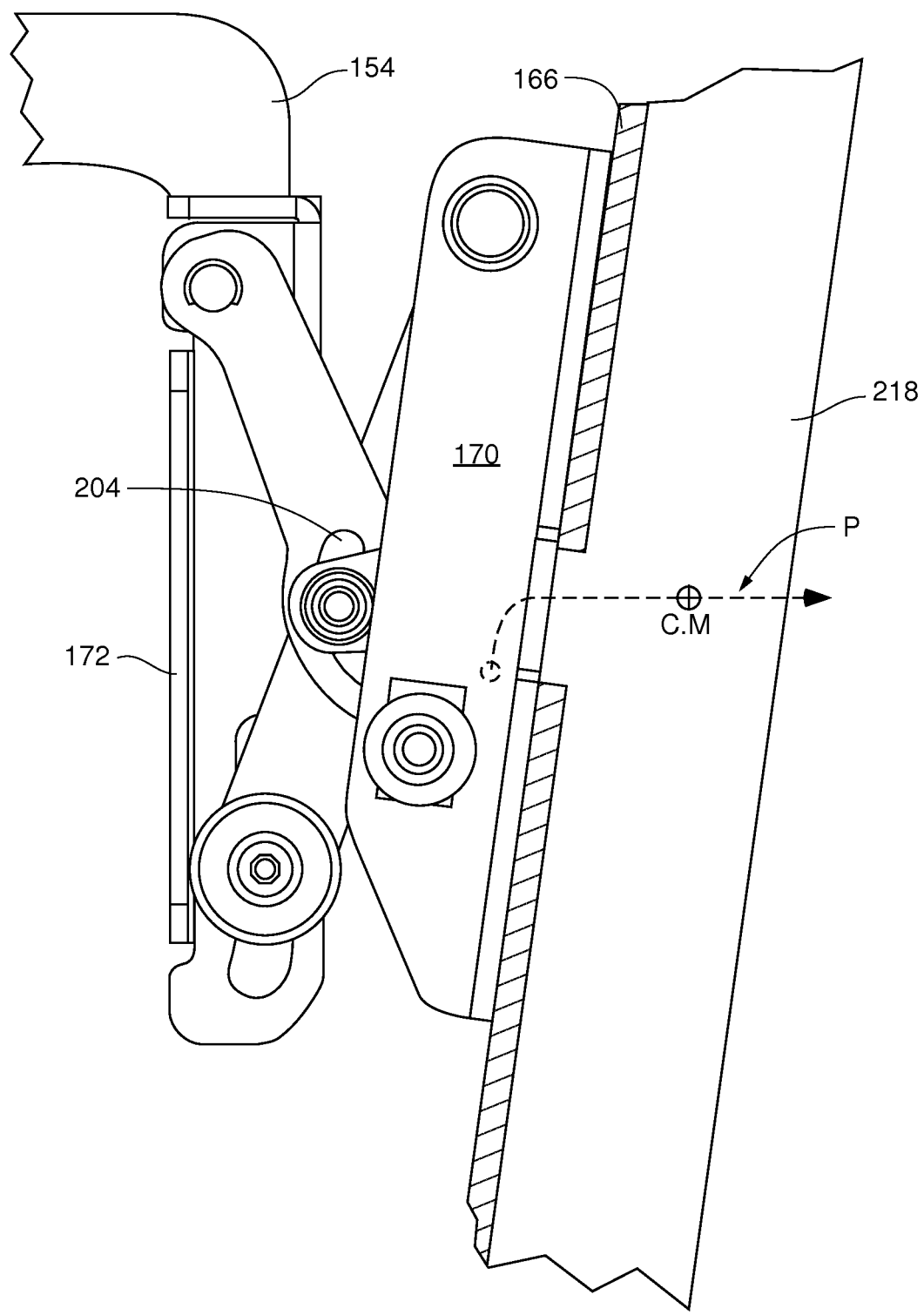
FIG. 7 is a fragmentary side cross-sectional view of the tilt assembly of the mount of FIG. 1 with a flat panel display attached, depicting the mount in an intermediate tilt position.
Figure 8:
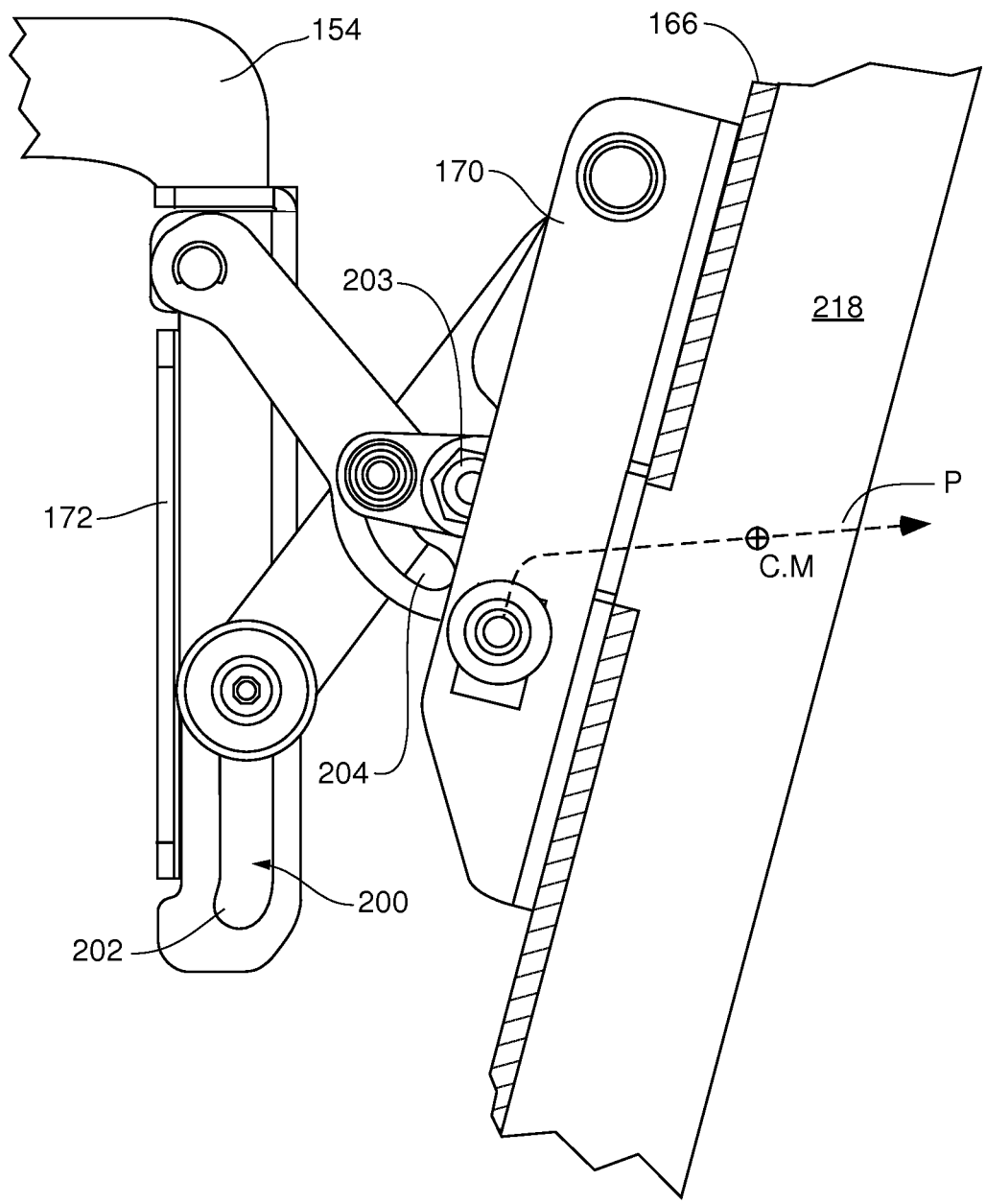
FIG. 8 is a fragmentary side cross-sectional view of the tilt assembly of the mount of FIG. 1 with a flat panel display attached, depicting the mount in a fully tilted tilt position.

The tilting operation of display tilt assembly 168 is depicted in FIGS. 6-8. As depicted in FIG. 6, with the tilt assembly in the most upright position, top end 216 of flat panel display 218 is tipped slightly in a rearward direction toward the wall on which mount 100 is attached, thereby introducing a slight bias against forward tilting motion when in this most upright position to inhibit unintentional tilting if the mount is bumped. When a user grips the top end 216 of flat panel display 218 and pulls it away from the wall, the tilting motion is initiated. Preferably, the center of mass (C.M.) of flat panel display 218 is positioned slightly outward from planar portion 180 of interface body 170 as depicted in FIGS. 6-8. The dimensions and geometry of the linkage formed by first arms 174, second arms 176 interface body 170 and support interface 172, are arranged such that as motion is initiated, center of mass C.M. proceeds along a prescribed path of travel (P), first rising a slight distance in a mostly vertical direction as motion is first initiated, and then traveling horizontally level with the ground. The slight bias against initiation of tilting motion provided by the initial rise in motion is advantageous as it tends to inhibit undesired tilting if the mount is unintentionally bumped or jarred. With center of mass C.M. traveling in a horizontal path level with the ground, flat panel display 218 will be essentially self-balancing and will maintain any desired position along the full range of tilting motion from the fully upright position of FIG. 6 to the fully tilted position of FIG. 8.

Another advantageous feature of embodiments of mount 100 is that the mount can be easily installed by only one person. To begin the installation, wall bracket 114 is attached to the wall 220 as depicted in FIG. 9, substantially parallel to the floor or ceiling. Wall bracket 114 may be attached by first screwing lag bolts 222 into wall 220. Bracket 114 can then be attached by advancing the heads of lag bolts 222 through enlarged end 224 of the keyhole slots 130, and sliding wall bracket 114 to the right to engage lag bolts 222 in narrower portion 226 of keyhole slots 130. C-clips 228 can then be clipped around lag bolts 222 below the heads in order to prevent the heads of lag bolts 222 from being drawn back through enlarged end 224 of the keyhole slots 130 should wall bracket 114 be unintentionally shifted.

Figure 12:
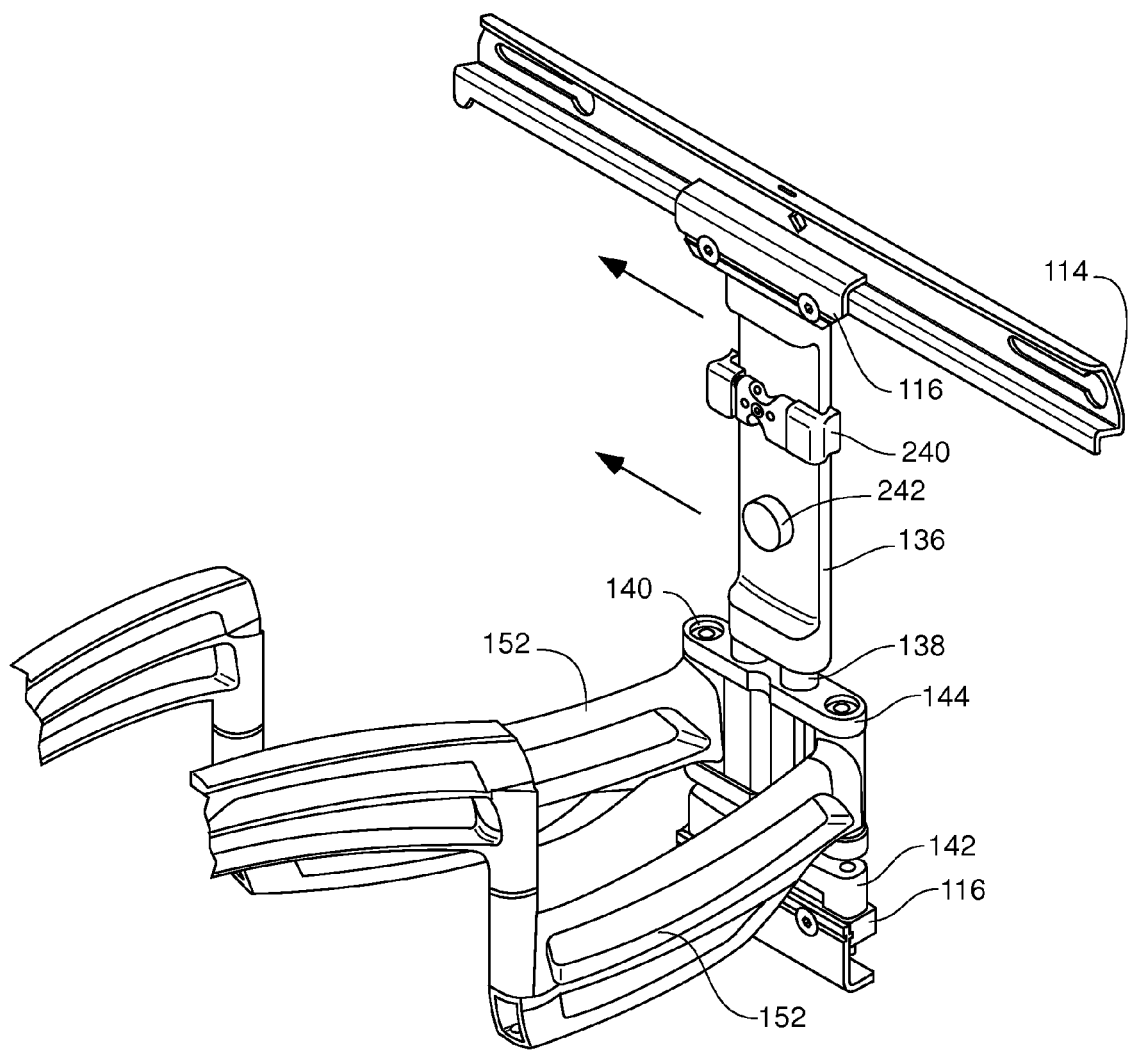
FIG. 12 is a perspective view of the mount of FIG. 1 in an intermediate stage of installation.

With wall bracket 114 in place, clamp assembly 116 can be loosened by loosening fasteners 136, and then slid onto lip 123 of wall bracket 114 from the right as depicted in FIG. 12. It will be appreciated that central support assembly 110 can be positioned at any point along the length of wall bracket 114 so as to enable positioning of mount 100 at nearly any desired position on the wall. Tab 128 provides safety by preventing central support assembly 110 from being advanced past the left end of the wall bracket 114. Once central support assembly 110 is in the desired position, fasteners 136 can be tightened to clamp central support assembly tightly to wall bracket 114.

Figure 13:
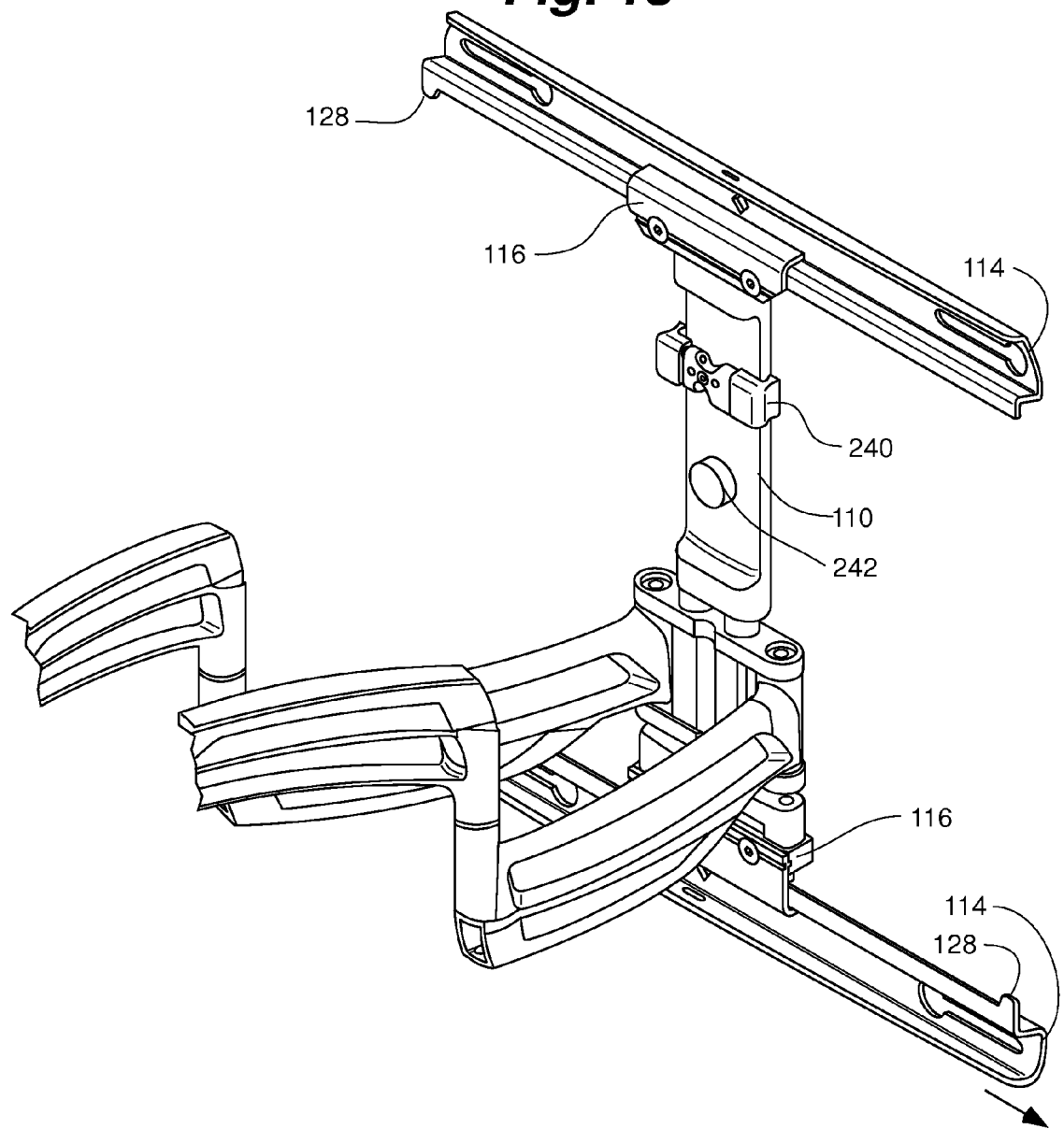
FIG. 13 is a perspective view of the mount of FIG. 1 in a further intermediate stage of installation.
Figure 14:
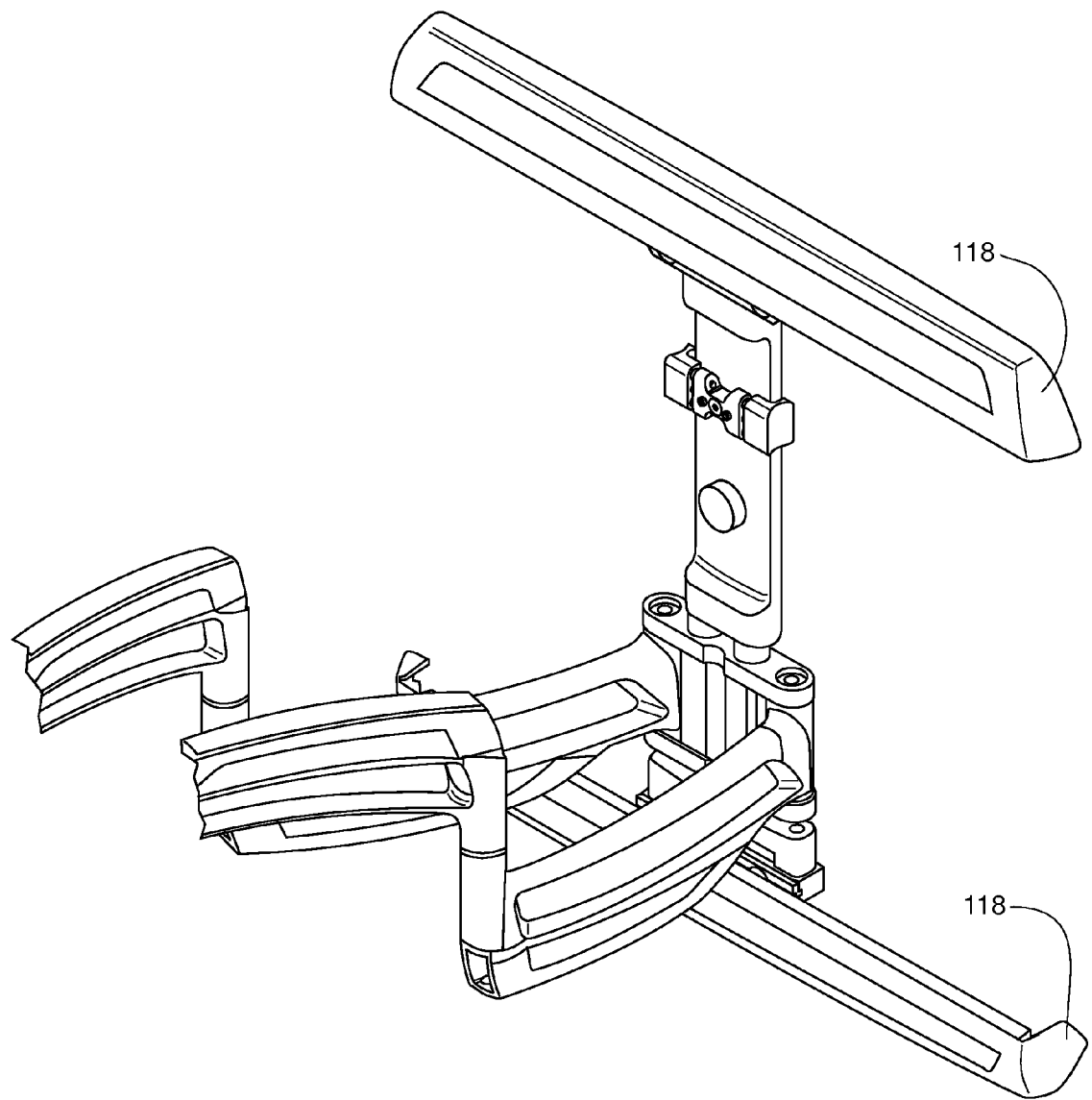
FIG. 14 is a perspective view of the mount of FIG. 1 in a final stage of installation, with the wall bracket covers depicted in phantom for clarity.

With central support assembly 110 now suspended from wall bracket 114, the wall bracket 114 of lower wall bracket assembly 112 can be advanced through the clamp assembly 116 at the lower end of central support assembly 110 as depicted in FIG. 13. Once in the desired position, this lower wall bracket 114 can be secured to the wall with lag bolts. Upwardly projecting tab 128 prevents central support assembly from being disengaged by advancing too far to the right. Both wall brackets can then be concealed with covers 118 as depicted in FIG. 14.

Figure 15:
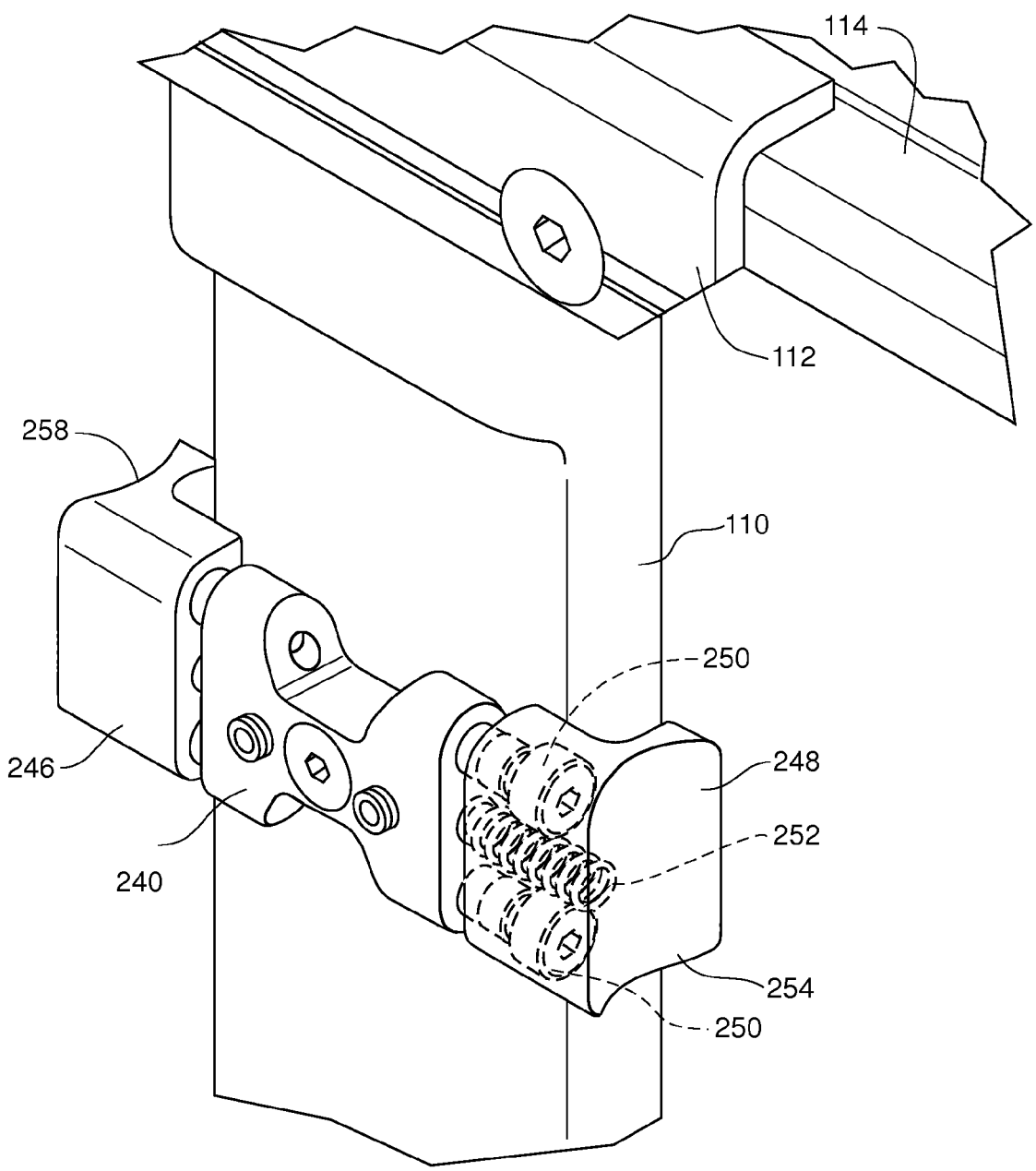
FIG. 15 is a fragmentary view of a portion of the mount of FIG. 1 depicting an arm retention assembly.
Figure 16:
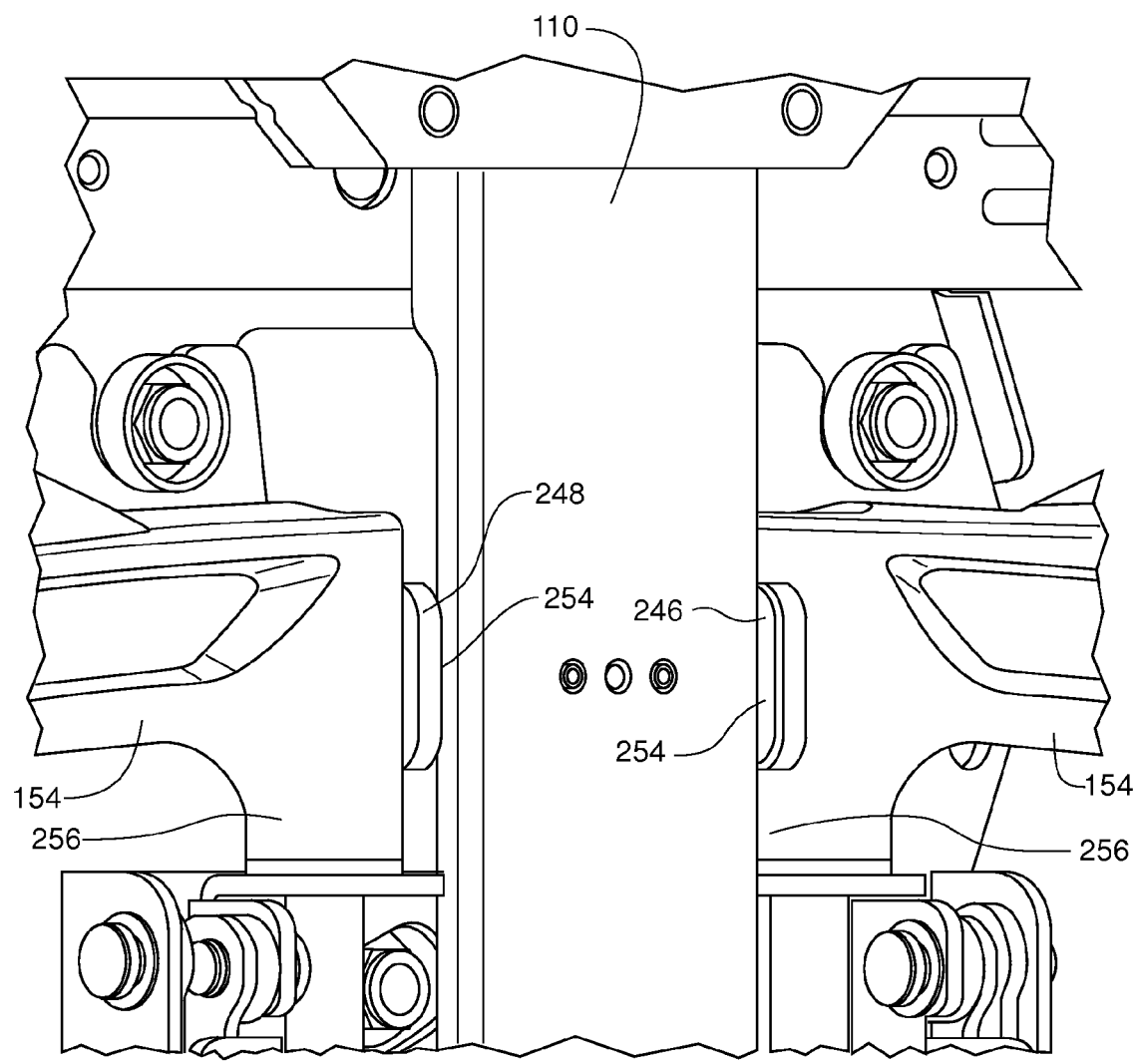
FIG. 16 is a fragmentary rear perspective view of a portion of the mount of FIG. 1 depicting the arm retention assembly retaining the arms in a folded position.

A further advantageous feature of embodiments of the invention is depicted in FIGS. 1 and 15. In particular, the mount 100 may be provided with an arm retention assembly 240 and an adjustable arm stop 242. Arm retention assembly 240 generally includes body portion 244, latch members 246, 248, guide members 250, and spring biasing members 252. Guide members 250 extend laterally from body portion 244 and are received in apertures in latch members 246, 248. Spring biasing members 252 bias latch members 246, 248, outwardly away from body portion 244. Outside ends 254 of latch members 246, 248, are conformingly shaped to front ends 256 of upper arms 154.

In operation, as arms 154 are pushed toward central support assembly 110 to place mount 100 in the folded position of FIG. 2, front ends 256 of upper arms 154 contact latch members 246, 248, and urge them inward against the bias of spring biasing member 252. When the mount is fully folded, front ends 256 nestle into the conforming shape of outside ends 254 of latch members 246, 248, and the springs 252 urge the latch members against the arms 154, thereby tending to retain arms 154 in position. The arms can then be deployed to the extended position by simply grasping the display and pulling outwards, thereby dislodging arms 154 from latch members 246, 248.

Stop 242 generally includes a rubber or other elastomeric bumper element 260 which has a threaded fastener (not depicted) extending from the back side. The threaded fastener is threaded into central support assembly 110. By turning stop 242 to either thread into or out of central support assembly 110, the position of the outer face of the bumper 260 can be positioned closer or further away from central support assembly 110. In operation, the outer face of the bumper 260 contacts the inner face 262 of support interface 172, and provides a stop to prevent the swing arms from being folded too far inwardly toward the wall.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A mount for an electronic display device comprising:
   a wall interface including a substantially vertically oriented column portion;
   an articulating arm assembly operably coupled with the column portion; and
   a display interface presenting a display interface surface for receiving the electronic display device and a display tilt assembly enabling selective horizontal tilting of the display interface surface relative to the wall, the display tilt assembly operably coupled to the articulating arm assembly and including a support interface portion defining a vertically oriented recess on a rear side thereof, the articulating arm assembly enabling selective shifting of the display interface between a first position closely proximate the wall interface such that the column portion of the wall interface is received in the recess of the support interface portion, and a second position in which the display interface is spaced apart from the wall interface.

2. The mount of claim 1, wherein the wall interface further includes an upper mounting bracket and a lower mounting bracket spaced apart from the upper mounting bracket, the column portion extending between the upper mounting bracket and the lower mounting bracket.

3. The mount of claim 1, wherein the articulating arm assembly comprises a pair of articulating arms.

4. The mount of claim 1, wherein the display tilt assembly is selectively tiltable between a first generally upright position in which a top edge of the display interface surface is positioned rearwardly relative to a bottom edge of the display interface surface and a tilt position in which the top edge of the display interface surface is positioned forwardly relative to a bottom edge of the display interface surface.

5. The mount of claim 4, wherein a center of mass of an electronic display received on the display mounting surface first rises vertically, and then proceeds along a substantially horizontal path relative to the ground as the display tilt assembly is shifted between the first generally upright position and the tilt position.

6. The mount of claim 5, wherein the display tilt assembly further comprises an interface body and pair of spaced apart arm assemblies operably coupling the interface body with the support interface portion.

7. The mount of claim 6, wherein the spaced apart arm assemblies each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

8. An electronic display system comprising:
   an electronic display device;
   a wall interface including a substantially vertically oriented column portion;
   an articulating arm assembly operably coupled with the column portion; and
   a display interface presenting a display interface surface receiving the electronic display device thereon and a display tilt assembly enabling selective horizontal tilting of the electronic display device relative to the wall, the display tilt assembly operably coupled to the articulating arm assembly and including a support interface portion defining a vertically oriented recess on a rear side thereof, the articulating arm assembly enabling selective shifting of the display interface between a first position closely proximate the wall interface such that the column portion of the wall interface is received in the recess of the support interface portion, and a second position in which the display interface is spaced apart from the wall interface.

9. The system of claim 8, wherein the wall interface further includes an upper mounting bracket and a lower mounting bracket spaced apart from the upper mounting bracket, the column portion extending between the upper mounting bracket and the lower mounting bracket.

10. The system of claim 8, wherein the articulating arm assembly comprises a pair of articulating arms.

11. The system of claim 8, wherein the display tilt assembly is selectively tiltable between a first generally upright position in which a top edge of the electronic display device is positioned rearwardly relative to a bottom edge of the electronic display device and a tilt position in which the top edge of the electronic display device is positioned forwardly relative to a bottom edge of the electronic display device.

12. The system of claim 11, wherein a center of mass of the electronic display device first rises vertically, and then proceeds along a substantially horizontal path relative to the ground as the display tilt assembly is shifted between the first generally upright position and the tilt position.

13. The system of claim 12, wherein the display tilt assembly further comprises an interface body and pair of spaced apart arm assemblies operably coupling the interface body with the support interface portion.

14. The system of claim 13, wherein the spaced apart arm assemblies each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

15. A mount for an electronic display device comprising:
   a wall interface including a substantially vertically oriented column portion;
   an articulating arm assembly operably coupled with the column portion; and
   a display interface presenting a display interface surface for receiving the electronic display device and tilt means for enabling selective horizontal tilting of the display interface surface relative to the wall, the tilt means including a support interface defining a vertically oriented recess on a rear side thereof, the articulating arm assembly enabling selective shifting of the display interface between a first position closely proximate the wall interface such that the column portion of the wall interface is received in the recess of the support interface, and a second position in which the display interface is spaced apart from the wall interface.

16. The mount of claim 15, wherein the articulating arm assembly comprises a pair of articulating arms.

17. The mount of claim 15, wherein the tilt means enables selective tilting between a first generally upright position in which a top edge of the display interface surface is positioned rearwardly relative to a bottom edge of the display interface surface and a tilt position in which the top edge of the display interface surface is positioned forwardly relative to a bottom edge of the display interface surface.

18. The mount of claim 17, wherein a center of mass of an electronic display received on the display mounting surface first rises vertically, and then proceeds along a substantially horizontal path relative to the ground as the tilt means is shifted between the first generally upright position and the tilt position.

19. The mount of claim 18, wherein the tilt means comprises an interface body and pair of spaced apart arm assemblies operably coupling the interface body with the support interface portion.

20. The mount of claim 19, wherein the spaced apart arm assemblies each include a first arm pivotally coupled to a second arm, the first arm pivotally coupled to the interface body at a pivot, the pivot being vertically shiftable to enable the center of mass of an electronic display received on the display mounting surface to rise vertically as the display tilt assembly is shifted between the first generally upright position and the tilt position.

* * * * *